No. 781,042. PATENTED JAN. 31, 1905.
M. M. WOOD.
GLASS FOR WATER GAGES.
APPLICATION FILED JULY 13, 1903.

WITNESSES:

INVENTOR
Montraville M. Wood.
by Albert H. Dunn
Atty.

No. 781,042. Patented January 31, 1905.

UNITED STATES PATENT OFFICE.

MONTRAVILLE M. WOOD, OF SCHENECTADY, NEW YORK, ASSIGNOR TO GENERAL ELECTRIC COMPANY, A CORPORATION OF NEW YORK.

GLASS FOR WATER-GAGES.

SPECIFICATION forming part of Letters Patent No. 781,042, dated January 31, 1905.

Application filed July 13, 1903. Serial No. 165,252.

*To all whom it may concern:*

Be it known that I, MONTRAVILLE M. WOOD, a citizen of the United States, residing at Schenectady, in the county of Schenectady, State of New York, have invented certain new and useful Improvements in Glasses for Water-Gages, of which the following is a specification.

This invention relates to water-gages for indicating the height of the liquid in a closed vessel, such as a steam-boiler. Under some circumstances it is difficult to read the exact height of the water, owing to insufficient light, a dirty tube, or the vibration of the machine, the latter being especially the case in an automobile.

My invention aims to produce a plain and unmistakable indication of the falling of the water-level below a given point.

It consists of a glass gage-tube having a hollow-lens formation at the level to be indicated and a spot of contrasting color at the back in line with said lens portion. When the lens portion is filled with water, it magnifies the spot, so that it is distinctly visible some distance away; but when the water falls below the level of the spot the latter, being of such small dimensions, can be seen only with difficulty.

Figure 1:
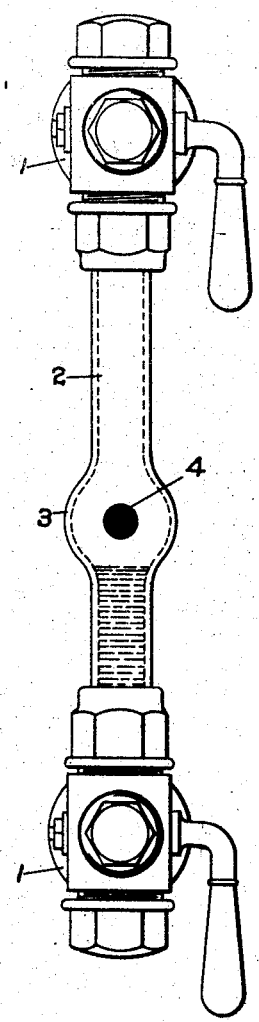
Figure 2:
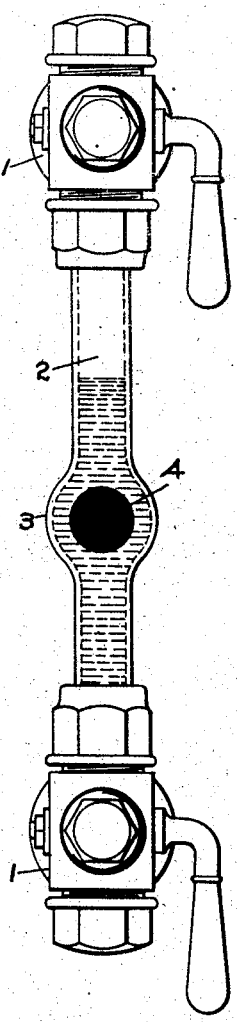
Figure 3:
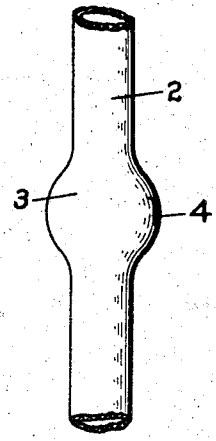

In the accompanying drawings, Figure 1 is a front elevation of a water-gage provided with my improved glass, the water-level being below the indicating-spot. Fig. 2 is a similar view showing the water-level above said spot. Fig. 3 is a side elevation of the magnifying portion of the tube.

The water-gage has the usual fittings 1 at each end for attaching it to a steam-boiler or other closed reservoir for holding liquid. The tube 2 is of glass, and at some predetermined point it is provided with a lens portion, preferably a spherical enlargement or bulb 3. At the back of this lens portion and disposed in the focal axis thereof is a stationary indicator, such as the spot 4, of black or some color which contrasts strongly with the liquid in the tube. When the liquid fills the bulb, the spot seen through the spherical transparent mass of liquid is magnified several times, as shown in Fig. 2, so that it is plainly visible even in a dim light or through a dirty tube or when the machine is vibrating badly, as in the case of a rapidly-moving automobile; but when the liquid falls below the spot and the bulb is empty the spot appears so small as to be discerned with difficulty, and the operator is advised at once that the level of the liquid is below the normal.

I have shown the tube with only one spot and lens portion; but it is obvious that I am not limited in the number to be used as circumstances may require.

In accordance with the patent statutes I have described the principle of operation of my invention, together with the apparatus which I now consider to represent the best embodiment thereof; but I desire to have it understood that the apparatus shown is only illustrative and that the invention can be carried out by other means.

What I claim as new, and desire to secure by Letters Patent of the United States, is—

1. A water-gage glass having a spherical lens portion which magnifies when containing a transparent liquid, and an indicator in line therewith.

2. A water-gage glass having a spherical bulb at a predetermined level, and a spot on the back thereof.

3. A water-gage, comprising a tube of glass having a spherical enlargement intermediate its ends, and an indicator arranged in fixed relation thereto so as to be abnormally enlarged by the magnifying power of the water contained in the enlargement.

4. A water-gage, comprising a glass having a spherical enlargement, and an indicator arranged in coöperative relation thereto so as to be magnified when water fills the enlargement.

5. A water-gage, comprising a glass tube having a bulb portion which magnifies when containing a transparent liquid, and an indicator disposed in the focal axis of the bulb portion.

In witness whereof I have hereunto set my hand this 11th day of July, 1903.

MONTRAVILLE M. WOOD.

Witnesses:
 BENJAMIN B. HULL,
 HELEN ORFORD.